UNITED STATES PATENT OFFICE.

JEAN MARIE RAYMOND, OF PARIS, FRANCE.

COMPOSITION OF MATTER FOR VULCANIZING RUBBER.

SPECIFICATION forming part of Letters Patent No. 518,016, dated April 10, 1894.

Application filed October 21, 1893. Serial No. 488,765. (No specimens.) Patented in France July 31, 1893, No. 231,883.

*To all whom it may concern:*

Be it known that I, JEAN MARIE RAYMOND, a citizen of the Republic of France, residing at Paris, France, have invented an Improved Composition of Matter for Vulcanizing Rubber, (patented in France July 31, 1893, No. 231,883;) and I declare the following to be a full, clear, and exact description of the same, such as will enable others skilled in the art to which it appertains to make and use the same.

My invention relates to the improved composition of matter for vulcanizing rubber hereinafter specified and claimed. Hitherto the vulcanization of rubber has been accomplished by various methods involving the use or presence of sulphuret of carbon ($C.S_2$) usually in a heated condition, which methods have been attended with great injury and danger to health of those engaged in carrying out the process, causing often very serious results to health. The fetid, garlic smell of this product is known to be very disagreeable and its well known poisonous character has made special precautions necessary to avoid injurious effects therefrom, these precautions however being very inefficient to effectually overcome the dangers to health attending its use, especially in breathing an atmosphere saturated with its vapors.

The object of my invention is more particularly to overcome these dangers in the vulcanization of rubber, and to provide a new compound for accomplishing the desired end permitting a cold vulcanization of rubber without using the dangerous product, the sulphuret of carbon, above referred to. As the results of my investigations in this direction, it was discovered that the vulcanization of rubber by chloride of sulphur, ($S_2Cl_2$,) and using sulphuret of carbon as a dissolvent, rendered the rubber dry, hard and brittle. This result has generally been believed to be due to the action of chloride of sulphur alone. But I ascertained that this result was due, at least to some extent, to the presence of the sulphuret of carbon also. It is known that rubber, matter composed of carbon and hydrogen ($C_4H_7$) is formed of two isomeric substances, the first solid and at the same time inelastic, is very resisting. The second, on the contrary, being sticky, pitchy and readily dissolved.

It has been observed that rubber when immersed in a dissolvent, penetrates the dissolvent with more or less rapidity according to the nature of the dissolvent used, but that only one of the two constituent substances, the second above mentioned, is dissolved, the other, the first above mentioned, remaining insoluble. The action of vulcanization, however, is to render equal the two constituent substances of the rubber, or more exactly, to render the second substance quite similar to the first by taking away its pitchy character and giving to it an elastic and resisting character. To attain this result, I ascertained that the dissolvent used ought to approach, by its chemical constitution, as near as possible to the constitution of the matter to be treated, viz., the rubber, and be composed, as in the case of rubber, of two elements, carbon and hydrogen. As sulphuret of carbon does not contain hydrogen, I use benzine, which is composed of equal parts of hydrogen and carbon ($C_6H_6$) in solution, with the chloride of sulphur ($S_2Cl_2$). I found, however, that this solution alone did not remain sufficiently limpid and constant. The two products ere long became dissociated, and a precipitate was formed causing a gradual waste of the vulcanizing power of the solution. After various experiments I found that the solution of benzine and chloride of sulphur was rendered constant by dissolving in the benzine a determined quantity of camphor ($C_{10}H_{10}O$) before introducing the chloride of sulphur. The stability of the solution was thus obtained. Camphor, it is well known, has an affinity with chlorhydric acid and sulphur gases and is not attacked by chlorine. I have found that this solution of benzine, camphor and chloride of sulphur will give to the rubber the same qualities of extensibility and resistance, and gives to it also a more supple character, and that it can be preserved for a considerable time without undergoing any appreciable alterations, except a gradual accentuation of coloring.

My invention has also in view, furthermore, to provide a composition of matter for the bath for vulcanizing rubber by which to obtain and preserve, by only one operation, the adhesive quality in vulcanized rubber, commonly lost by its vulcanization. In carrying out this purpose of my invention, I found that by varying the time of immersion of the rubber in the solution of benzine, camphor and chloride of sulphur, thin articles could not only be vulcanized, at different degrees, but one could at will, preserve, temporarily, on the surface of the rubber, a part of the adhesive character possessed by non-vulcanized rubber. But I obtained a more satisfactory result by adding a small quantity, say one to three per cent., in weight, of oleic acid, ($C_{18}H_{34}O_2$,) to the solution of benzine, camphor and chloride of sulphur. The nature of this constitutent sufficiently explains its action.

As a result of my discoveries, I have found the following formula very satisfactory, although I would have it understood that the proportions of the several ingredients may be varied according to the nature and thickness of the articles of rubber to be vulcanized, for example—benzine, in weight, thirty to fifty parts; camphor, in weight, two to five parts; chloride of sulphur, in weight, one to two parts; oleic acid, in weight, one to two parts, the latter being employed where the conservation of the adhesive character of the rubber is desired, otherwise it may be entirely omitted.

I would have it understood that I may use benzine of different qualities as well as derivations of this product, no matter of what denominations, any derivations of this product being included, in the scope of my invention, under the general term of benzine.

The treatment of rubber by immersing it in a bath formed of this solution, gives most efficient results, the compound possessing the following advantages over those hitherto commonly employed. First, it is used with no danger of poisoning as where sulphuret of carbon is employed. Second, it facilitates the operation of vulcanization in so far that it is not necessary to pay attention to the degree of temperature during the operation. Third, it secures great economy in the cost of materials employed, commonly about thirty per cent. Fourth, it gives to the rubber all the properties of vulcanization without rendering it hard and brittle, conserving or not, at the will of the operator, the adhesive character on the surface commonly lost by sulphuration caused by the use of the compound commonly employed hitherto.

What I claim as my invention is—

1. The herein described compound for vulcanizing rubber consisting of benzine, or its derivatives, camphor and chloride of sulphur, substantially in the proportions hereinbefore set forth.

2. The herein described compound for vulcanizing rubber, consisting of benzine, or its derivatives, camphor, and chloride of sulphur, and oleic acid, substantially in the proportions hereinbefore set forth.

In testimony whereof I sign this specification in the presence of two witnesses.

JEAN MARIE RAYMOND.

Witnesses:
 N. S. WRIGHT,
 H. R. WHEELER.